(12) United States Patent
Park et al.

(10) Patent No.: US 11,429,628 B2
(45) Date of Patent: Aug. 30, 2022

(54) TRANSACTION GROUPING FOR OVERWRITE MERGE

(71) Applicant: SAMSUNG ELECTRONICS CO., LTD., Suwon-si (KR)

(72) Inventors: Heekwon Park, Cupertino, CA (US); Ho Bin Lee, San Jose, CA (US); Ilgu Hong, Santa Clara, CA (US); Yang Seok Ki, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 79 days.

(21) Appl. No.: 16/834,231

(22) Filed: Mar. 30, 2020

(65) Prior Publication Data

US 2021/0089549 A1 Mar. 25, 2021

Related U.S. Application Data

(60) Provisional application No. 62/903,662, filed on Sep. 20, 2019.

(51) Int. Cl.
*G06F 17/00* (2019.01)
*G06F 16/25* (2019.01)

(52) U.S. Cl.
CPC .................................. *G06F 16/25* (2019.01)

(58) Field of Classification Search
CPC ...... G06F 16/25; G06F 16/2365; G06F 16/23; G06F 16/235; G06F 16/27; G06F 9/542; G06F 9/546; G06F 9/466; G06F 9/4881; G06F 2209/548
See application file for complete search history.

(56) References Cited

U.S. PATENT DOCUMENTS

| 7,818,745 | B2 * | 10/2010 | Snyder | G06F 9/466 |
| | | | | 718/101 |
| 8,990,335 | B2 | 3/2015 | Fauser et al. | |
| 10,235,402 | B1 | 3/2019 | Franklin et al. | |
| 10,565,184 | B2 * | 2/2020 | Shacham | G06F 16/2322 |
| 2014/0258777 | A1 * | 9/2014 | Cheriton | G06F 16/2365 |
| | | | | 714/19 |
| 2014/0330767 | A1 * | 11/2014 | Fowler | G06F 16/288 |
| | | | | 707/607 |
| 2014/0379638 | A1 * | 12/2014 | Li | G06F 16/27 |
| | | | | 707/610 |

(Continued)

*Primary Examiner* — Greta L Robinson
(74) *Attorney, Agent, or Firm* — Lewis Roca Rothgerber Christie LLP

(57) ABSTRACT

Provided is a method of data storage, the method including identifying a plurality of transactions in a pending queue, the transactions having one or more key value updates respectively corresponding to a plurality of keys, identifying a commonly associated key of the plurality of keys associated with commonly associated key value updates of the key value updates belonging to different ones of the transactions, respectively assigning transaction group IDs to the transactions based on respective transaction IDs assigned to the transaction group IDs, grouping the transactions into a respective transaction group of a plurality of transaction groups based on the assigned transaction group ID, and merging conflicting data writes corresponding to the commonly associated key value updates of the commonly associated key for grouped transactions of the transactions that are in a same one of the transaction groups.

18 Claims, 4 Drawing Sheets

(56) References Cited

U.S. PATENT DOCUMENTS

2016/0171002 A1* 6/2016 Bendel ................ G06F 16/2379
707/714
2019/0080107 A1 3/2019 Gupta et al.

* cited by examiner

TRANSACTION GROUPING FOR OVERWRITE MERGE

CROSS-REFERENCE TO RELATED APPLICATION(S)

This application claim priority to, and the benefit of, U.S. Provisional Application Ser. No. 62/903,662, filed Sep. 20, 2019, entitled Transaction Grouping For Overwrite Merge, the content of which being incorporated herein in its entirety.

FIELD

One or more aspects of embodiments of the present disclosure relate generally to data storage.

BACKGROUND

In the operation of a key value store, a given key may be written over many times, and various keys may be updated substantially concurrently. Multiple transactions for updating various key values may be placed in a pending queue. Different transactions within a pending queue may respectively correspond to conflicting key value updates that all correspond to a common key. For example, a first write operation, or a first transaction, may seek to perform a key value update to a key when, thereafter, a second write operation/transaction seeks to perform a different key value update to the same key.

As each transaction is processed, each key value update is processed in turn. Accordingly, a particular key may be updated with a key value only to be updated again shortly thereafter with a different key value. That is, despite a key value update of an earlier-in-time transaction being rendered irrelevant by a later-in-time transaction prior to the initial key value update occurring, both key value updates may occur, one needlessly. The different transactions in such a scenario generally occur relatively closely in time to one another.

SUMMARY

Embodiments described herein provide improvements to data storage.

According to one embodiment of the present disclosure, there is provided a method of data storage, the method including identifying a plurality of transactions in a pending queue, the transactions having one or more key value updates respectively corresponding to a plurality of keys, identifying a commonly associated key of the plurality of keys associated with commonly associated key value updates of the key value updates belonging to different ones of the transactions, respectively assigning transaction group IDs to the transactions based on respective transaction IDs assigned to the transaction group IDs, grouping the transactions into a respective transaction group of a plurality of transaction groups based on the assigned transaction group ID, and merging conflicting data writes corresponding to the commonly associated key value updates of the commonly associated key for grouped transactions of the transactions that are in a same one of the transaction groups.

When a crash occurs at a crashed transaction of the transactions in a crashed transaction group of the transaction groups, the method may further include reattempting only linked ones of the transactions in the crashed transaction group, which are linked due to merging the conflicting data writes, to the crashed transaction.

The method may further include removing one of the transactions having only one or more earlier-in-time key value updates that are rendered irrelevant by one or more later-in-time key value updates corresponding to the same respective keys, the later-in-time key value updates being in one or more others of the transactions occurring later in time than the removed one of the transactions.

The method may further include determining a pair of consecutive transactions lack any commonly associated key value updates corresponding to a common key of the plurality of keys, and respectively assigning group IDs to the consecutive transactions such that the consecutive transactions are located in different respective transaction groups.

The method may further include determining which pair of consecutive transactions have a fewest number of commonly associated key value updates corresponding to a common key of the plurality of keys, and respectively assigning group IDs to the consecutive transactions such that the consecutive transactions are located in different respective transaction groups.

Assigning the transaction group ID may be further based on analysis of a total number of commonly associated key value updates across different transactions.

The method may further include writing all merged key value updates of the conflicting data writes of one of the transaction groups to one or more storage devices, and updating metadata corresponding to the merged key value updates of the one of the transaction groups only when all of the merged key value updates are confirmed to have been written to the one or more storage devices.

The method may further include assigning the transaction ID to the transactions.

According to another embodiment of the present disclosure, there is provided a system for performing merging with transaction grouping, the system including a transaction module for identifying a plurality of transactions in a pending queue, the transactions having one or more key value updates respectively corresponding to a plurality of keys, identifying a commonly associated key of the plurality of keys associated with commonly associated key value updates of the key value updates belonging to different ones of the transactions, respectively assigning transaction group IDs to the transactions based on respective transaction IDs assigned to the transaction group IDs, and grouping the transactions into a respective transaction group of a plurality of transaction groups based on the assigned transaction group ID, and a merging module for merging conflicting data writes corresponding to the commonly associated key value updates of the commonly associated key for grouped transactions of the transactions that are in a same one of the transaction groups.

When a crash occurs at a crashed transaction of the transactions in a crashed transaction group of the transaction groups, the transaction module may be further configured to reattempt only linked ones of the transactions in the crashed transaction group, which are linked due to merging the conflicting data writes, to the crashed transaction.

The merging module may be further configured to remove one of the transactions having only one or more earlier-in-time key value updates that are rendered irrelevant by one or more later-in-time key value updates corresponding to the same respective keys, the later-in-time key value updates being in one or more others of the transactions occurring later in time than the removed one of the transactions.

The transaction module may be further configured to determine a pair of consecutive transactions lack any commonly associated key value updates corresponding to a common key of the plurality of keys, and respectively assign group IDs to the consecutive transactions such that the consecutive transactions are located in different respective transaction groups.

The transaction module may be further configured to determine which pair of consecutive transactions have a fewest number of commonly associated key value updates corresponding to a common key of the plurality of keys, and respectively assign group IDs to the consecutive transactions such that the consecutive transactions are located in different respective transaction groups.

The transaction module may be further configured to assign the transaction group ID based on analysis of a total number of commonly associated key value updates across different transactions.

The system may further include an inflight request buffer that is configured to write all merged key value updates of the conflicting data writes of one of the transaction groups to one or more storage devices, and update metadata corresponding to the merged key value updates of the one of the transaction groups only when all of the merged key value updates are confirmed to have been written to the one or more storage devices.

The transaction module may be further configured to assign the transaction ID to the transactions.

According to yet another embodiment of the present disclosure, there is provided a non-transitory computer readable medium implemented on a system for performing merging with transaction grouping, the non-transitory computer readable medium having computer code that, when executed on a processor, implements a method of data storage, the method including identifying a plurality of transactions in a pending queue, the transactions having one or more key value updates respectively corresponding to a plurality of keys, identifying a commonly associated key of the plurality of keys associated with commonly associated key value updates of the key value updates belonging to different ones of the transactions, respectively assigning transaction group IDs to the transactions based on respective transaction IDs assigned to the transaction group IDs, grouping the transactions into a respective transaction group of a plurality of transaction groups based on the assigned transaction group ID, and merging conflicting data writes corresponding to the commonly associated key value updates of the commonly associated key for grouped transactions of the transactions that are in a same one of the transaction groups.

When a crash occurs at a crashed transaction of the transactions in a crashed transaction group of the transaction groups, the computer code, when executed on the processor, may further implement the method of data storage by reattempting only linked ones of the transactions in the crashed transaction group, which are linked due to merging the conflicting data writes, to the crashed transaction.

The computer code, when executed on the processor, may further implement the method of data storage by removing one of the transactions having only one or more earlier-in-time key value updates that are rendered irrelevant by one or more later-in-time key value updates corresponding to the same respective keys, the later-in-time key value updates being in one or more others of the transactions occurring later in time than the removed one of the transactions.

The computer code, when executed on the processor, may further implement the method of data storage by determining a pair of consecutive transactions lack any commonly associated key value updates corresponding to a common key of the plurality of keys, and respectively assigning group IDs to the consecutive transactions such that the consecutive transactions are located in different respective transaction groups.

Accordingly, the system of embodiments of the present disclosure is able to improve data storage by reducing the number of transactions that must be rolled back (reattempted by the system) following a system failure to ensure data consistency.

BRIEF DESCRIPTION OF THE DRAWINGS

Non-limiting and non-exhaustive embodiments of the present embodiments are described with reference to the following figures, wherein like reference numerals refer to like parts throughout the various views unless otherwise specified.

Figure 1:
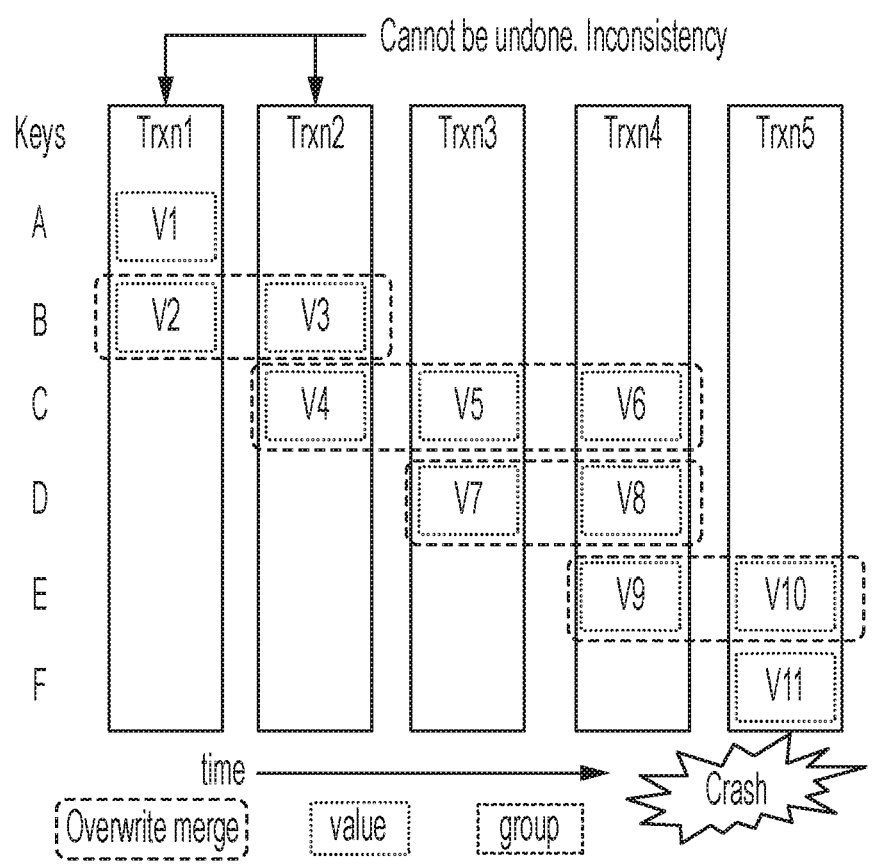
FIG. 1 is a block diagram depicting overwrite merging and transaction dependencies arising therefrom.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, layers, and regions in the figures may be exaggerated relative to other elements, layers, and regions to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When a certain embodiment may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

To improve write efficiency in storage devices by reducing the number of key value updates, "inline overwrite merging" or "overwrite merging," which may be referred to as "in-place updating," enables the merging of conflicting writes that correspond to a common key and that occur within a given timeframe. The conflicting writes correspond to different respective transactions occurring within a given time frame such that the transactions are both present in the pending queue at substantially the same time.

Accordingly, overwrite merging allows an older-in-time key value update to a particular key to be discarded in favor of a newer-in-time key value update to the same key. That is, conflicting pending writes to a common key occurring within a given timeframe may be "merged" by discarding the irrelevant earlier-in-time write in favor of the last-in-time write. Accordingly, a total number of key value updates/writes may be reduced, thereby reducing system overhead.

The concept of overwrite merging may be applied as write reduction methods in association with various KV storage methods (e.g., in association with a key value store used in conjunction with a key-value solid state drive (KVSSD) that is compatible with existing persistent key-value stores, such as RocksDB, which is developed by FACEBOOK®, and compatible with MyRocks, a RocksDB storage engine that is also developed by FACEBOOK®). For example, one benchmark thereof is the ability for a multithreaded sequential write, wherein each thread creates keys duplicate with other threads' keys. Accordingly, adding the ability for a simple overwrite merge may be beneficial, and the reduction of write amplification may be beneficial as flash memory is applied in the storage media space.

Although overwrite merging can be used to reduce write amplifications, overwrite merging generally may not be solely used for transactional systems. For example, overwrite merging/in-place updating may have unwanted effects when used in combination with transactional batch processing. Such unwanted effects may result from a long tail of pending transactions due to transaction dependencies, thereby potentially causing data inconsistency, and making overwrite merging impractical. Further, crash consistency can potentially be broken. That is, although overwrite merging enables the reduction of write amplification, and improves performance (e.g., improves input-output operations per second (IOPS)), overwrite merging may not be feasible when there is a large number of transactions. For example, when there are a large number of transactions, data consistency may be broken when a crash occurs during one of multiple cascaded/linked transactions. Further, long tails of pending transactions may occur when multiple overwrites occur.

Accordingly, embodiments of the present disclosure enable the grouping of transactions (e.g., the use of transaction groups) that are cascaded by allowing inline overwrite merging. To achieve the disclosed embodiments, writing of the corresponding metadata may be delayed until all transaction operations in the group are written to devices. As noted, although inline overwrite merge according to the presented embodiments can be used reduce write amplifications, inline overwrite merge may not be solely used for transactional systems. By performing embodiments of the present disclosure with flash memory technology, some flash devices may demonstrate improved write endurance and performance (e.g., IO operations per second (IOPS)).

FIG. 1 is a block diagram depicting overwrite merging and transaction dependencies arising therefrom.

Referring to FIG. 1, a first transaction Trxn1 may have a key value update V2 that may be overwrite merged with a key value update V3 of a second transaction Trxn2. The second transaction Trxn2 may have a key value update V4 that may be overwrite merged with key value updates V5 and V6 of third and fourth transactions Trxn3 and Trxn4, respectively. The third transaction Trxn3 may also have a key value update V7 that may be overwrite merged with a key value update V8 of the fourth transaction Trxn4. Furthermore, the fourth transaction Trxn4 may have a key value update V9 that may be overwrite merged with a key value updated V10 of a fifth transaction Trxn5.

Accordingly, due to the interdependency of various transactions due to their key value updates having the ability to be overwrite merged, the transactions may be linked together by a chain of interdependencies that is results therefrom. As a result, unwanted effects resulting from overwrite merging may occur in the event of a crash or unexpected power outage.

In the present example, as shown in FIG. 1, if a crash occurs after the key value update V9 of the fourth transaction Trxn4 and prior to the key value update V10 of the fifth transaction Trxn5, all of the linked transactions Trxn1 through Trxn5 may be rolled back (i.e., reattempted by the system to ensure validity and data consistency). That is, because of the crash, the key value update V9 of the fourth transaction Trxn4 cannot be determined to be valid. Because the key value update V9 of the fourth transaction Trxn4 cannot be determined to be valid, completion of the fourth transaction Trxn4 cannot be determined to be valid.

Furthermore, because the key value update V6 of the fourth transaction Trxn4 is overwrite merged with the key value updates V4 and V5 of the second and third transactions Trxn2 and Trxn3, neither of the key value updates V4 and V5 can be confirmed as having been validly written. Therefore, the second and third transactions Trxn2 and Trxn3 similarly cannot be determined to be valid.

Finally, due to key value updates V2 and V3 of first and second transactions Trxn1 and Trxn2 being overwrite merged, and because the second transaction Trxn2 cannot be determined to be valid, the first transaction Trxn1 is unable to be determined to be valid and has to be rolled back as well.

Accordingly, due to transaction dependencies arising from overwrite merging, a crash may require a relatively large number of transactions to be reattempted by the system in order to achieve data consistency.

Further, there may be a scenario following a crash in which the transactions are non-recoverable. For example, there may be a situation in which it is not possible for the first transaction Trxn1 to be rolled back due to the metadata of key value update V1 having been already written to a storage device, and due to there being no record of previous metadata in any key value store implementation (e.g., see S380 in FIG. 3, and table 460 in FIG. 4, to be described further below).

Embodiments of the present disclosure may avoid issues that may potentially arise from overwrite merging by combining overwrite merging with a concept referred to herein as "transaction grouping." That is, by grouping transactions via transaction grouping, transactional writes to the same key can be reliably merged even in the event of a crash, thereby improving write efficiency.

Figure 2:
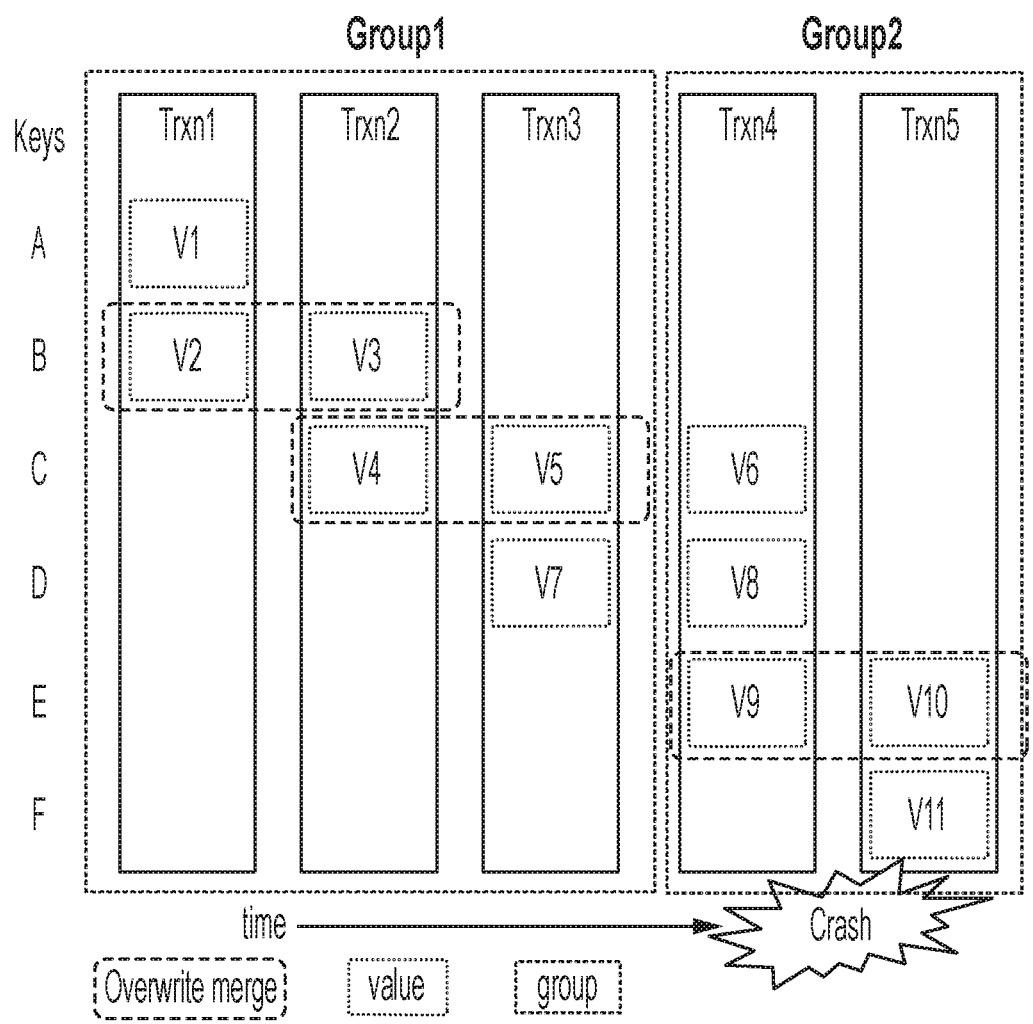
FIG. 2 is a block diagram depicting overwrite merging with transaction grouping according to some embodiments of the present disclosure.

FIG. 2 is a block diagram depicting overwrite merging with transaction grouping according to some embodiments of the present disclosure.

For example, referring to FIG. 2, different transactions may be grouped by assigning respective transaction group IDs (e.g., Group1 or Group2) to the transactions. The transaction group IDs may be generated from one or more corresponding transaction IDs. Furthermore, if no overwrite merge occurs, a new transaction group ID can be started. For example, if a number of updates exceeds a threshold, a new transaction group ID can be started.

By generating respective transaction group IDs for each of the transactions based on each transaction's transaction ID, one or more transaction group demarcations separating respective transaction groups can be determined. As an example, in an implementation of the present embodiment, a transaction group ID may be the most significant 59 bits of a transaction ID. If a new transaction group ID is to be used, the next transaction ID can be increased.

In the example shown in FIG. 2, consecutive transactions are included in a single transaction group, although the disclosed embodiments are not limited thereto. Further, the specific number of transactions per transaction group is not particularly limited.

In the example shown in FIG. 2, the first through third transactions Trxn1, Trxn2, and Trxn3 are each assigned a first group transaction ID to be placed in a first group "Group1," while fourth and fifth transactions Trxn4 and Trxn5 are assigned a second group transaction ID to be placed in a second group "Group2." Accordingly, even though the third and fourth transactions Trxn3 and Trxn4 include respective key value updates that each correspond to a same respective key (e.g., key value updates V5 and V6 corresponding to key "C," and key value updates V7 and V8 corresponding to key "D"), those key value updates will not be overwrite merged due to the third and fourth transactions Trxn3 and Trxn4 respectively belonging to different transaction groups Group1 and Group2.

Further, grouping, as described above, may solve a scenario following a crash in which the transactions are otherwise non-recoverable. That is, conventionally, transactions may be non-recoverable when it is not possible for the first transaction Trxn1 to be rolled back due to the metadata of key value update V1 having been already written to a storage device, and due to there being no record of previous metadata in any key value store implementation. However, grouping according to embodiments of the present disclosure avoids such a non-recoverable crash because metadata for updated key values may be updated only if the metadata for the updated key values is written to the storage device to guarantee data consistency in the event of a crash (e.g., see S380 in FIG. 3, and table 460 in FIG. 4, to be described further below).

Accordingly, and unlike the example described above with respect to FIG. 1, if a crash occurs after the key value update V9 of the fourth transaction Trxn4 and prior to the key value update V10 of the fifth transaction Trxn5, only the linked transactions of Trxn4 and Trxn5 that are part of the same transaction group Group2 are rolled back. Because the transactions Trxn1, Trxn2, and Trxn3 of the first transaction group Group1 are confirmed to be valid, they need not be rolled back as a result of the crash.

That is, by separating consecutive transactions Trxn3 and Trxn4 into different transaction groups, the linking between the consecutive transactions Trxn3 and Trxn4 that would otherwise occur due to overwrite merging is absent/removed. Accordingly, the third transaction Trxn3 may be determined to be valid, and inefficiencies arising from a crash may be reduced.

Generally, the advantages of transaction grouping with overwrite merge provided by the embodiments disclosed herein include improving write efficiency in the event a crash occurs. As demonstrated above, should a crash occur, the system may not need to roll back past the beginning of the given transaction group associated with the crash.

Also, advantages of transaction grouping with overwrite merge provided by the embodiments disclosed herein may be by preventing overwrite merging between different adjacent transactions that belong to different respective transaction groups, while still allowing overwrite merging across different transactions commonly assigned a given transaction group ID to be within a respective transaction group.

Accordingly, the system may not have to roll back as far as it would have to in the absence of transaction grouping. However, the system is still able to achieve, at least to some degree, the advantages associated with overwrite merging by overwrite merging some of the key value updates.

In the example shown in FIG. 2, it may be noted that inefficiencies may result from having to write to keys C and D twice each (key value updates V5 and V6 for key C, and key value updates V7 and V8 for key D). Accordingly, in some embodiments, the transaction group demarcations may be assigned by assessing which consecutive transactions, if any, do not have any key value updates that may be overwrite merged with each other. In other embodiments, the transaction group demarcations may be assigned by assessing which consecutive transactions have the fewest key value updates that are eligible to be overwrite merged with each other.

Further, in other embodiments of the present disclosure, the system may allow the generation of transaction group IDs to be adjusted based on analysis of common respective keys corresponding to the key value updates across different transactions.

For example, in the example shown in FIG. 2, none of the key value updates from the third transaction Trxn3 are used (V5 and V7 of Trxn3 are both rendered irrelevant by V6 and V8 of Trxn4). Accordingly, the system could evict Trxn3 from the first transaction group Group1. For example, a key object has links to key value updates, and each key value update object contains a transaction ID. Background threads, or "write workers," can be used to examine key value updates, and to find possible overwrite merges. These background threads can create a new transaction group ID (e.g., if a number of updates exceeds a threshold).

Figure 3:
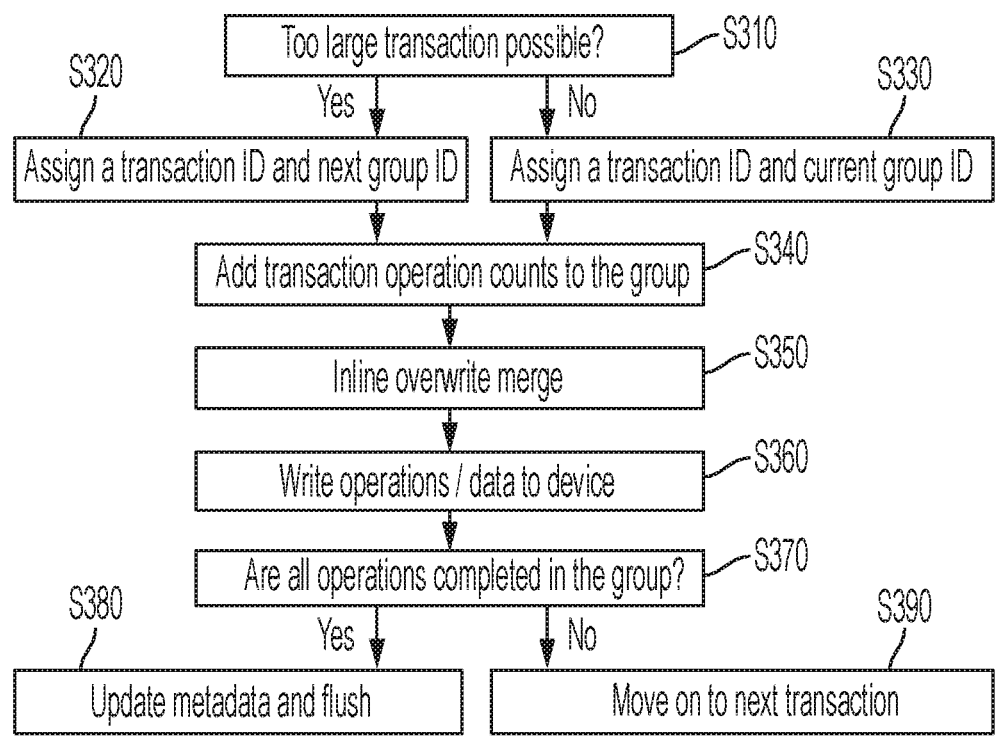
FIG. 3 is a flowchart depicting a method of overwrite merging with transaction grouping, according to embodiments of the present disclosure.

FIG. 3 is a flowchart depicting a method of overwrite merging with transaction grouping, according to embodiments of the present disclosure.

Referring to FIG. 3, according to embodiments of the present disclosure, the disclosed systems may initially determine whether it is possible that an incoming transaction may be too large to successfully perform overwrite merging with transaction grouping (S310). If so, a transaction ID and a subsequent transaction group ID may be assigned to the transaction (S320). If not, a transaction ID and a current transaction group ID may be assigned to the transaction (S330).

After the transaction ID and the transaction group ID is assigned to the transaction, the transaction operation count may be added to the group (S340). Then, inline overwrite merging may be performed on transactions including the subject incoming transaction (S350). Thereafter, write operations may be performed to write the data corresponding to the transactions to one or more devices (S360).

Then, the disclosed systems may determine whether all operations in the group have been completed (S370). If all operations in the group have been completed, the metadata corresponding thereto may be updated and flushed (S380). If less than all operations in the group have been completed, the next transaction may be processed (S390) (e.g., until all operations in the group have been completed).

Figure 4:
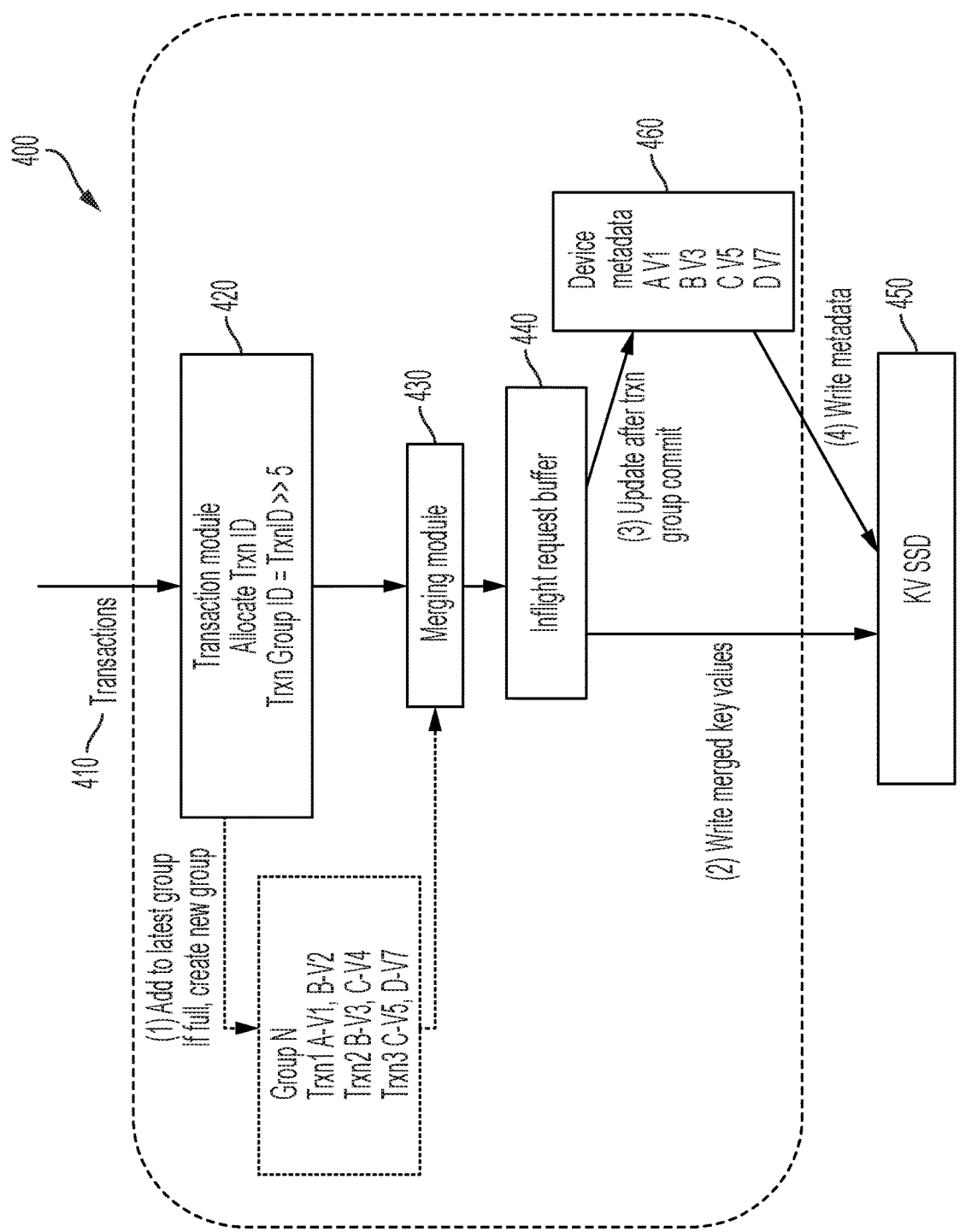
FIG. 4 is a block diagram depicting a workflow according to embodiments of the present disclosure.

FIG. 4 is a block diagram depicting a workflow according to embodiments of the present disclosure.

Referring to FIG. 4, transactions 410 may be received by the system 400 for performing overwrite merging with transaction grouping, and may be directed to a transaction module 420. The transaction module 420 may allocate a transaction ID and a transaction group ID to each of the transactions 410. The transaction module 420 may add the most recently received transaction to a latest-in-time group. Once the most recent group becomes full, the transaction module 420 may create a new group for subsequent transactions 410.

Referring back to FIG. 2, Group 1 includes transactions Trxn1, Trxn2, and Trxn3 including key value updates V1, V2, V3, V4, V5, and V7 corresponding to keys A, B, C, and D, respectively.

After the transaction group (e.g., Group 1) is created, a merging module 430 may perform overwrite merging of the key value updates. Then, an inflight request buffer 440 may write overwrite merged key values to a device (e.g., a KVSSD) 450. Once all of the overwrite merged key values of the transaction group have been successfully written to the device 450, a table 460 containing device metadata may be updated. Finally, the metadata may be written from the table 460 to the device 450.

According to the above, embodiments of the present disclosure are able to group transactions that are cascaded by using inline overwrite merge, and are thereby able to delay the associated flushing of metadata, as metadata write operations may be delayed until all operations in an associated transaction group are written to the corresponding devices. Thus, embodiments of the present disclosure are able to achieve crash recovery.

Further, embodiments of the present disclosure may aim to form transaction groups with a largest possible number of cascaded transactions, while avoiding unsuitable delays associated with metadata write operations, and while also separating non-cascaded transactions into different respective transaction groups. Accordingly, the implementation of transaction groups according to the disclosed embodiments makes overwrite merge work seamlessly with transactions, while enabling crash consistency and reducing pending transactions, thereby improving data storage technology.

What is claimed is:

1. A method of data storage, the method comprising:
identifying transactions in a pending queue, the transactions having one or more key value updates corresponding to keys;
identifying a commonly associated key of the keys associated with commonly associated key value updates of the key value updates belonging to different ones of the transactions;
assigning transaction group IDs to the transactions based on an analysis of a total number of commonly associated key value updates across different transactions;
grouping the transactions into a transaction group of transaction groups based on the assigned transaction group IDs; and
merging conflicting data writes corresponding to the commonly associated key value updates of the commonly associated key for grouped transactions of the transactions that are in a same one of the transaction groups, wherein the merging includes determining a first key value update to a first key and a second key value update to the first key and performing the second key value update.

2. The method of claim 1, further comprising:
determining a crash occurs at a crashed transaction of the transactions in a crashed transaction group of the transaction groups; and attempting linked ones of the transactions in the crashed transaction group, which are linked due to merging the conflicting data writes, to the crashed transaction.

3. The method of claim 1, further comprising demarcating for removal one of the transactions having one or more first key value updates corresponding to identical keys as one or more second key value updates, the second key value updates being in one or more others of the transactions that are other than the demarcated one of the transactions.

4. The method of claim 1, further comprising:
determining a pair of consecutive transactions have distinct associated key value updates corresponding to a common key of the keys; and
assigning group IDs to the consecutive transactions such that the consecutive transactions are located in different transaction groups.

5. The method of claim 1, further comprising:
determining a pair of consecutive transactions have a fewest number of commonly associated key value updates corresponding to a common key of the keys; and
assigning group IDs to the consecutive transactions such that the consecutive transactions are located in different transaction groups.

6. The method of claim 1, further comprising:
writing merged key value updates of the conflicting data writes of one of the transaction groups to one or more storage devices;
updating metadata corresponding to the merged key value updates of the one of the transaction groups; and
determining the merged key value updates exist in the one or more storage devices.

7. The method of claim 1, further comprising assigning a transaction ID to the transactions.

8. A system for performing merging with transaction grouping, the system comprising:
a transaction module for:
identifying transactions in a pending queue, the transactions having one or more key value updates corresponding to keys;
identifying a commonly associated key of the keys associated with commonly associated key value updates of the key value updates belonging to different ones of the transactions;
assigning transaction group IDs to the transactions based on an analysis of a total number of commonly associated key value updates across different transactions; and
grouping the transactions into a transaction group of transaction groups based on the assigned transaction group IDs; and
a merging module for merging conflicting data writes corresponding to the commonly associated key value updates of the commonly associated key for grouped transactions of the transactions that are in a same one of the transaction groups, wherein the merging includes determining a first key value update to a first key and a second key value update to the first key and performing the second key value update.

9. The system of claim 8, wherein the transaction module is further configured to determine a crash occurs at a crashed transaction of the transactions in a crashed transaction group of the transaction groups, and is further configured to attempt linked ones of the transactions in the crashed transaction group, which are linked due to merging the conflicting data writes, to the crashed transaction.

10. The system of claim 8, wherein the merging module is further configured to demarcate for removal one of the transactions having one or more first key value updates corresponding to identical keys as do one or more second key value updates, the second key value updates being in one or more others of the transactions that are other than the demarcated one of the transactions.

11. The system of claim 8, wherein the transaction module is further configured to:
determine a pair of consecutive transactions have distinct associated key value updates corresponding to a common key of the keys; and
assign group IDs to the consecutive transactions such that the consecutive transactions are located in different transaction groups.

12. The system of claim 8, wherein the transaction module is further configured to:
determine which pair of consecutive transactions have a fewest number of commonly associated key value updates corresponding to a common key of the keys; and
assign group IDs to the consecutive transactions such that the consecutive transactions are located in different transaction groups.

13. The system of claim 8, further comprising an inflight request buffer that is configured to:
write merged key value updates of the conflicting data writes of one of the transaction groups to one or more storage devices;
update metadata corresponding to the merged key value updates of the one of the transaction groups; and
determine the merged key value updates exist in the one or more storage devices.

14. The system of claim 8, wherein the transaction module is further configured to assign a transaction ID to the transactions.

15. A non-transitory computer readable medium implemented on a system for performing merging with transaction grouping, the non-transitory computer readable medium having computer code that implements a method of data storage, the method comprising:
- identifying transactions in a pending queue, the transactions having one or more key value updates corresponding to keys;
- identifying a commonly associated key of the keys associated with commonly associated key value updates of the key value updates belonging to different ones of the transactions;
- assigning transaction group IDs to the transactions based on an analysis of a total number of commonly associated key value updates across different transactions;
- grouping the transactions into a transaction group of transaction groups based on the assigned transaction group IDs; and
- merging conflicting data writes corresponding to the commonly associated key value updates of the commonly associated key for grouped transactions of the transactions that are in a same one of the transaction groups, wherein the merging includes determining a first key value update to a first key and a second key value update to the first key and performing the second key value update.

16. The non-transitory computer readable medium of claim 15, wherein the computer code further implements the method of data storage by determining a crash occurs at a crashed transaction of the transactions in a crashed transaction group of the transaction groups, and attempting linked ones of the transactions in the crashed transaction group, which are linked due to merging the conflicting data writes, to the crashed transaction.

17. The non-transitory computer readable medium of claim 15, wherein the computer code further implements the method of data storage by demarcating for removal one of the transactions having one or more first key value updates corresponding to identical keys as do one or more second key value updates, the second key value updates being in one or more others of the transactions that are other than the demarcated one of the transactions.

18. The non-transitory computer readable medium of claim 15, wherein the computer code further implements the method of data storage by:
- determining a pair of consecutive transactions have distinct associated key value updates corresponding to a common key of the keys; and
- assigning group IDs to the consecutive transactions such that the consecutive transactions are located in different transaction groups.

\* \* \* \* \*